(12) United States Patent
Inaba et al.

(10) Patent No.: US 11,400,753 B2
(45) Date of Patent: Aug. 2, 2022

(54) VEHICLE WHEEL

(71) Applicant: HONDA MOTOR CO., LTD., Tokyo (JP)

(72) Inventors: Ryoji Inaba, Wako (JP); Kenichi Nagatomi, Wako (JP); Toshimitsu Maki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 701 days.

(21) Appl. No.: 16/445,864

(22) Filed: Jun. 19, 2019

(65) Prior Publication Data

US 2019/0389248 A1   Dec. 26, 2019

(30) Foreign Application Priority Data

Jun. 22, 2018  (JP) .............................. JP2018-118393

(51) Int. Cl.
| | |
|---|---|
| *B60C 19/00* | (2006.01) |
| *B60B 21/02* | (2006.01) |
| *B60B 21/12* | (2006.01) |
| *G10K 11/172* | (2006.01) |

(52) U.S. Cl.
CPC .......... *B60B 21/026* (2013.01); *B60C 19/002* (2013.01); *G10K 11/172* (2013.01); *B60B 2900/133* (2013.01)

(58) Field of Classification Search
CPC ....... B60B 21/02; B60B 21/12; B60B 21/026; B60B 21/04; B60B 2900/133; B60C 5/00; B60C 19/002; G10K 11/172; B60R 13/08; B60R 13/0884
See application file for complete search history.

(56) References Cited

U.S. PATENT DOCUMENTS

| | | | | |
|---|---|---|---|---|
| 9,381,772 | B2 * | 7/2016 | Rathje | ..................... B60B 21/12 |
| 10,583,697 | B2 * | 3/2020 | Miura | ................... B60C 19/002 |
| 11,104,188 | B2 * | 8/2021 | Maki | ....................... B60B 21/12 |
| 11,230,142 | B2 * | 1/2022 | Kamiyama | .......... G10K 11/172 |
| 11,338,743 | B2 * | 5/2022 | Nagatomi | ........... B60R 13/0884 |
| 2019/0275847 | A1 * | 9/2019 | Nishi | .................... B60C 19/002 |
| 2019/0299707 | A1 * | 10/2019 | Saito | .................... B60B 21/026 |
| 2019/0299708 | A1 * | 10/2019 | Nishi | ..................... B60B 21/12 |
| 2019/0366763 | A1 * | 12/2019 | Nishi | .................... B60C 19/002 |

FOREIGN PATENT DOCUMENTS

| | | | | |
|---|---|---|---|---|
| JP | 2006231966 | A | * | 9/2006 |
| JP | 2007145191 | A | * | 6/2007 |
| JP | 2010095041 | A | * | 4/2010 |
| JP | 2012-045971 | A | | 3/2012 |
| JP | 2012051397 | A | * | 3/2012 |
| JP | 2020104816 | A | * | 7/2020 |
| JP | 2020111209 | A | * | 7/2020 |
| JP | 2020111257 | A | * | 7/2020 |

* cited by examiner

*Primary Examiner* — Edgardo San Martin
(74) *Attorney, Agent, or Firm* — Rankin, Hill & Clark LLP

(57) ABSTRACT

A vehicle wheel includes a pair of vertical walls that extend vertically up from an outer circumferential surface of a well portion and extend in a wheel circumferential direction and a Helmholtz resonator that is disposed between the pair of vertical walls and bonded to side surfaces of the pair of vertical walls with an adhesive, in which the Helmholtz resonator is not bonded to the outer circumferential surface of the well portion.

7 Claims, 5 Drawing Sheets

VEHICLE WHEEL

CROSS REFERENCE TO RELATED APPLICATIONS

This application claims the foreign priority benefit under 35 U.S.C. § 119 Japanese patent application No. 2018-118393 filed on Jun. 22, 2018, the disclosure of which is incorporated herein by reference.

FIELD OF THE INVENTION

The present invention relates to a vehicle wheel.

BACKGROUND OF THE INVENTION

A Helmholtz resonator has been known to be disposed on an outer circumferential surface of a well portion of a wheel and to have two edge portions protruding in a wheel width direction engage with circumferential grooves formed as recesses at rims (for example, see JP2012-045971A).

This Helmholtz resonator can be easily fitted into a circumferential groove because the two edge portions elastically deforms when the Helmholtz resonator is pressed to the outer circumferential surface of the well portion. Thus, this Helmholtz resonator can be easily attached to the wheel.

DESCRIPTION OF THE RELATED ART

JP2012-045971A discloses the vehicle wheel to which the Helmholtz resonator is attached as described above.

SUMMARY OF THE INVENTION

Currently, attempts have been made to use an adhesive to fix the Helmholtz resonator. However, if the wheel is deformed in a state where a bottom surface of the Helmholtz resonator is bonded to the outer circumferential surface of the well portion with an adhesive, the Helmholtz resonator is deformed, following the wheel deformation. This changes the capacity of the Helmholtz resonator and a cross-sectional area of a communication hole and leads to an insufficient reduction of a noise caused by a pipe resonance.

In view of this, an object of the present invention is to provide a vehicle wheel in which an adhesive is used for fixing a Helmholtz resonator that can reduce a noise caused by a pipe resonance even when the wheel is deformed.

In order to achieve the object, a vehicle wheel according to the present invention comprises: a pair of vertical walls that extend vertically up from an outer circumferential surface of a well portion and extend in a wheel circumferential direction; and a Helmholtz resonator that is disposed between the pair of vertical walls and bonded to side surfaces of the pair of vertical walls with an adhesive, in which the Helmholtz resonator is not bonded to the outer circumferential surface of the well portion.

According to the present invention, it is possible that a Helmholtz resonator is fixed with an adhesive and that a noise caused by a pipe resonance is sufficiently reduced even when the wheel is deformed.

DETAILED DESCRIPTION OF THE INVENTION

Next, vehicle wheels according to embodiments of the present invention are described in detail with reference to the drawings. In the referenced FIGS. 1 to 7, "X" indicates a wheel circumferential direction, "Y" indicates a wheel width direction, and "Z" indicates a wheel radial direction. In the wheel width direction Y, an inner side is referred to as "one side", and an outer side is referred to as "the other side."

<Overall Configuration of Vehicle Wheel>

Figure 1:
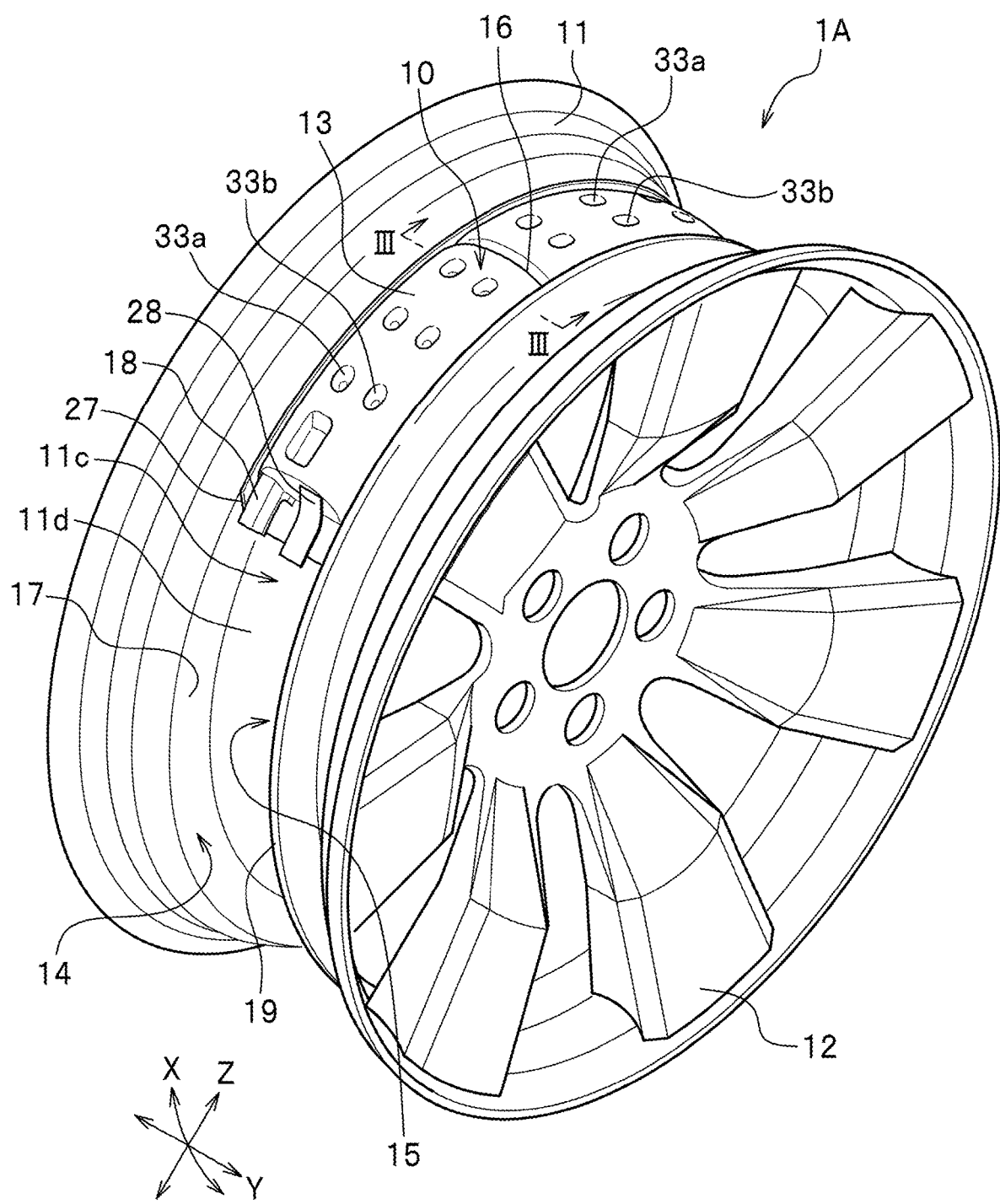
FIG. 1 is a perspective view of a vehicle wheel according to a first embodiment of the present invention.

FIG. 1 is a perspective view of a vehicle wheel 1A according to a first embodiment of the present invention. As illustrated in FIG. 1, the vehicle wheel 1A according to this embodiment comprises a Helmholtz resonator 10 attached to a rim 11. The Helmholtz resonator 10 may be made of such a synthetic resin as a polyamide resin, and the rim 11 may be made of such a metal as an aluminum alloy or a magnesium alloy. In FIG. 1, a reference sign 12 indicates a substantially circular plate-shaped disc to link the substantially cylindrical-shaped rim 11 to an unillustrated hub.

The rim 11 comprises a well portion 11c that is recessed inwardly in the wheel radial direction (toward the center of rotation) between unillustrated bead seats respectively formed at two end portions of the rim 11 in the wheel width direction Y. A distance between an outer circumferential surface 11d (see FIG. 4) of the well portion 11c defined as a bottom surface of the recess and a wheel shaft is approximately uniform throughout the wheel width direction Y.

The rim 11 of this embodiment comprises a pair of vertical walls 14, 15. The vertical walls 14, 15 extend outwardly from the outer circumferential surface 11d of the well portion 11c in the wheel radial direction and are apart from each other in the wheel width direction Y.

The vertical wall 14 formed at the one side (inner side) in the wheel width direction Y extends, for example, from a rising portion 17 that extends from the outer circumferential surface 11d of the well portion 11c toward a rim flange. The vertical wall 15, for example, comprises a circumferential wall 19 positioned at the middle of the outer circumferential surface 11d in the wheel width direction Y and extending in the wheel circumferential direction X.

the pair of vertical walls 14, 15 have a circular shape, extend in the wheel circumferential direction X, and are apart from each other in the wheel width direction. Thus, the pair of vertical walls 14, 15 respectively comprise opposing side surfaces 14a, 15a (see FIG. 3). The side surfaces 14a, 15a are, for example, substantially perpendicular to the outer circumferential surface 11d (see FIG. 3) of the well portion 11c.

<Helmholtz Resonator>

Figure 2:
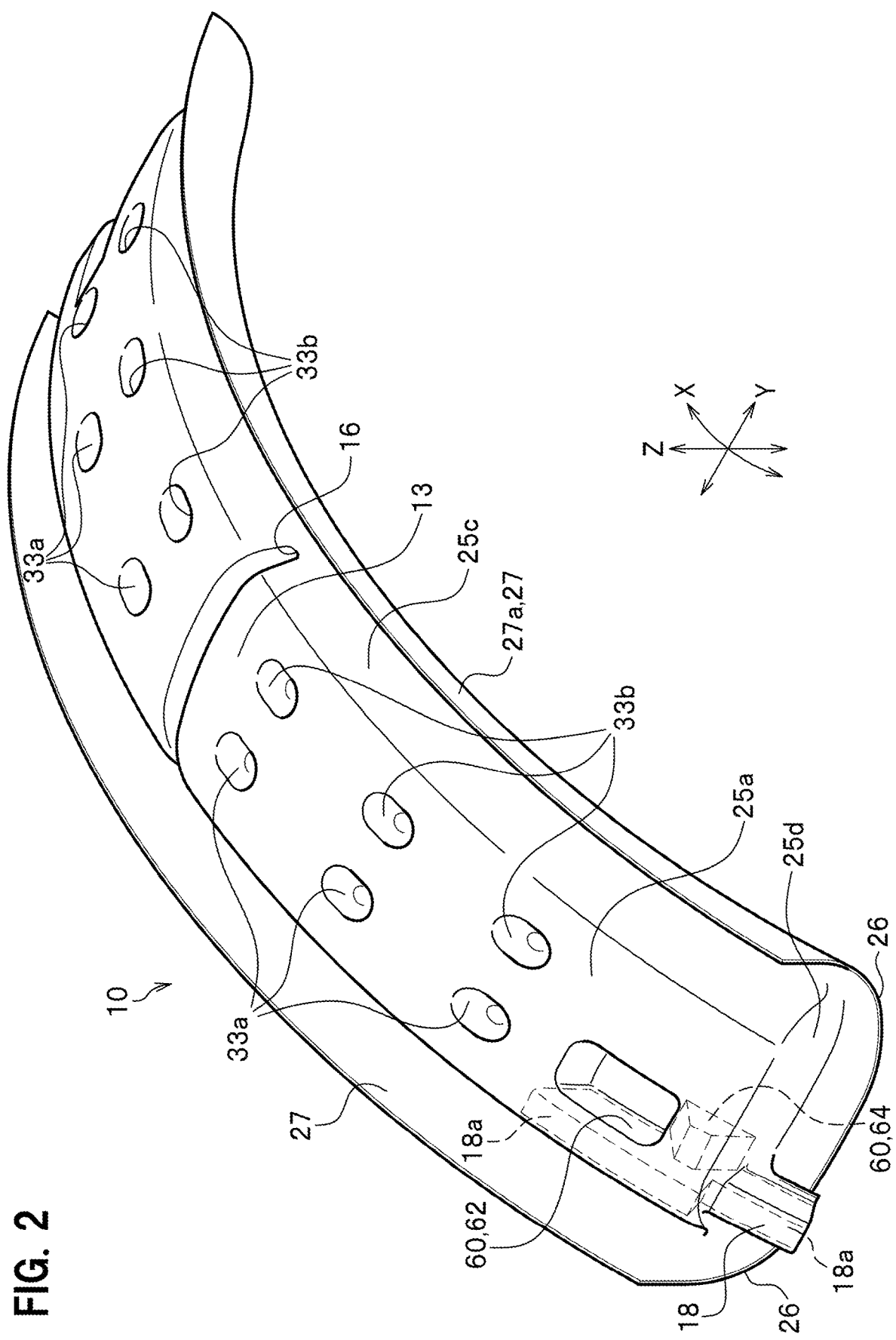
FIG. 2 is an overall perspective view of a Helmholtz resonator.
Figure 3:
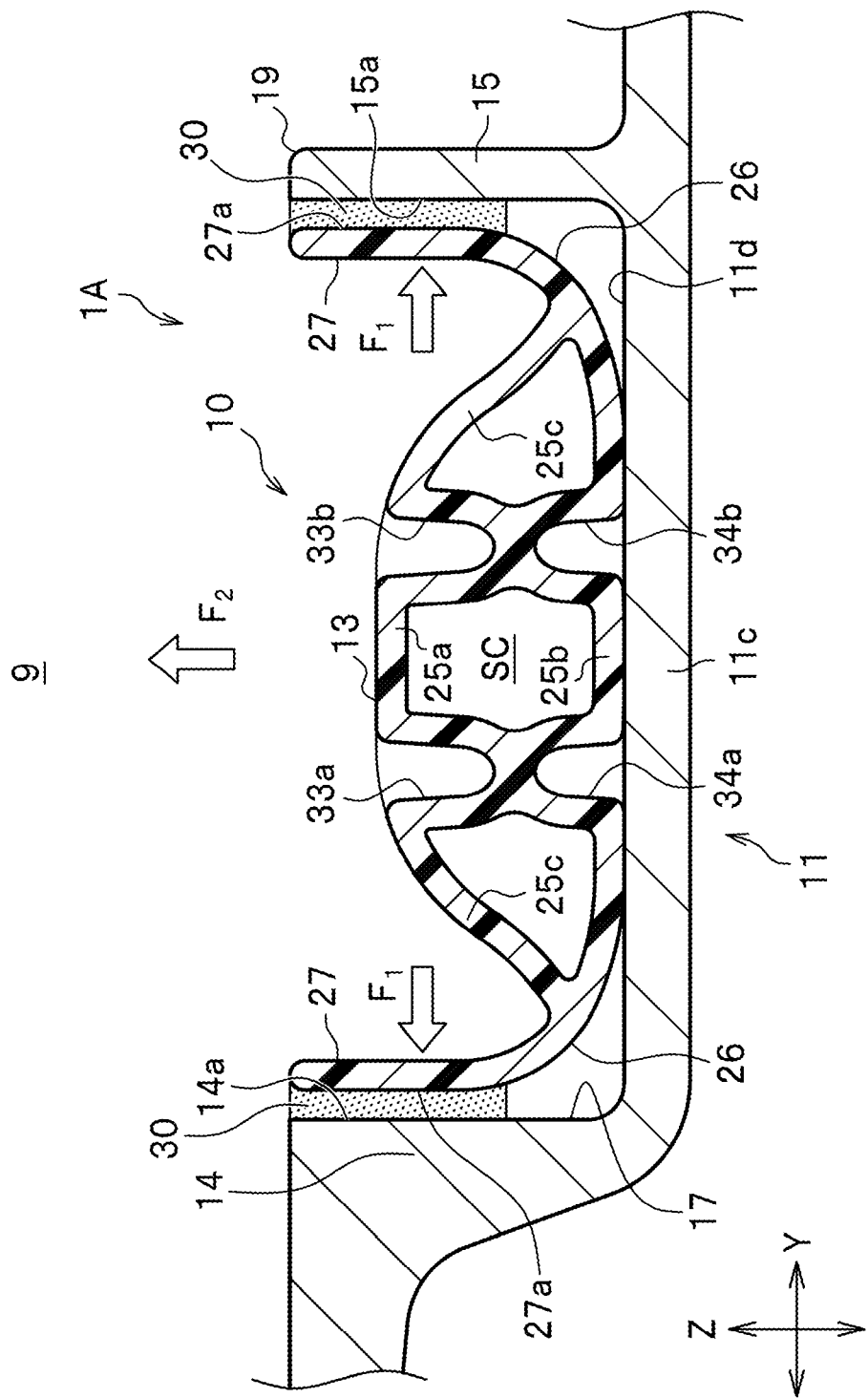
FIG. 3 is a cross-sectional view when the vehicle wheel according to the first embodiment of the present invention illustrated in FIG. 1 is cut along the III-III plane.

Next, the Helmholtz resonator 10 is described. FIG. 2 is an overall perspective view of the Helmholtz resonator 10. FIG. 3 is a cross-sectional view when the vehicle wheel according to the first embodiment of the present invention illustrated in FIG. 1 is cut along the III-III plane. As illustrated in FIG. 2, the Helmholtz resonator 10 is a member that is elongated in one direction and comprises a main body portion 13 and a tube body 18. This Helmholtz resonator 10 is formed to be symmetric in the wheel circumferential direction X relative to a partition wall 16 which extends in the wheel width direction Y.

The main body portion 13 is curved in its longitudinal direction. That is, the main body portion 13 extends in the wheel circumferential direction X when the Helmholtz resonator 10 is attached to the outer circumferential surface 11*d* (see FIG. 1) of the well portion 11*c*.

The main body portion 13 is hollow. The (unillustrated) hollow portion functions as a later-described sub air chamber SC (see FIG. 3). The hollow portion is divided into two parts separated by the partition wall 16 in the wheel circumferential direction X.

As illustrated in FIG. 3, a section orthogonal to a longitudinal direction (the wheel circumferential direction X in FIG. 2) of the main body portion 13 is a substantially rectangular that is elongated in the wheel width direction Y.

In detail, the main body portion 13 comprises a bottom portion 25*b* (bottom plate) extending along the outer circumferential surface 11*d* of the well portion 11*c*, side portions 25*c* (side plates) respectively facing the side surfaces 14*a*, 15*a* of the pair of vertical walls 14, 15, and a top portion 25*a* (top plate) positioned opposite to the bottom portion 25*b* in the wheel radial direction. The bottom portion 25*b*, the side portions 25*c*, and the top portion 25*a* are joined to each other, which result in the main body portion 13 having the substantially rectangular section.

According to this embodiment, the height of the main body portion 13 on the outer circumferential surface 11*d* of the well portion 11*c* (height in the wheel radial direction Z) is equal to or lower than the heights of the pair of vertical walls 14, 15. The top portion 25*a*, the bottom portion 25*b*, and the side portions 25*c* enclose the sub air chamber SC in the main body portion 13.

As illustrated in FIG. 2, the main body portion 13 comprises a pair of end wall portions 25*d*, 25*d* that close the sub air chamber SC at opposite ends in the wheel circumferential direction.

A plurality of top joining portions 33*a* formed on a side of the vertical wall 14*a* of the top portion 25*a* is aligned in the longitudinal direction of the top portion 25*a*. A plurality of top joining portions 33*b* formed on a side of the vertical wall 15 of the top portion 25*a* is aligned in the longitudinal direction of the top portion 25*a*. The top joining portions 33*a* are adjacent to the top joining portions 33*b* respectively in the wheel width direction.

As illustrated in FIG. 3, a plurality of bottom joining portions 34*a* is formed on a side of the vertical wall 14 of the bottom portion 25*b*, and each of the plurality of bottom joining portions 34*a* is aligned with a corresponding top joining portion 33*a*. A plurality of bottom joining portions 34*b* is formed on a side of the vertical wall 15 of the bottom portion 25*b*, and each of the plurality of bottom joining portions 34*b* is aligned with a corresponding top joining portion 33*b*.

The top joining portions 33*a*, 33*b* and the bottom joining portions 34*a*, 34*b* each have a substantially bottomed cylindrical shape. Each of the bottoms of the top joining portions 33*a* is joined to each of the bottoms of the bottom joining portions 34*a*. Additionally, each of the bottoms of the top joining portions 33*b* is joined to each of the bottoms of the bottom joining portions 34*b*. This allows the top portion 25*a* and the bottom portion 25*b* to be integrally joined to form the sub air chamber SC therein.

According to this embodiment, the top portion 25*a* and the bottom portion 25*b* are integrally joined by the top joining portions 33*a*, 33*b* which are formed as recesses of the top portion 25*a*, and the bottom joining portions 34*a*, 34*b* which are formed as recesses of the bottom portion 25*b*. However, the present invention may also have a configuration according to which the top portion 25*a* and the bottom portion 25*b* are integrally joined by joining (unillustrated) joining portions formed as recesses of either of the top portion 25*a* or the bottom portion 25*b* to the other one of the top portion 25*a* or the bottom portion 25*b*.

Next, the tube body 18 (see FIG. 1) is described. As illustrated in FIG. 1, the tube body 18 is positioned at the one side in the wheel width direction Y (inner side of the vehicle wheel 1) of the main body portion 13 and is formed to protrude from the main body portion 13 in the wheel circumferential direction X.

As described above, the Helmholtz resonator 10 of this embodiment is symmetrically formed in the wheel circumferential direction X relative to the partition wall 16. Thus, although only one tube body 18 is illustrated in FIG. 1, a pair of tube bodies 18 are symmetrically provided at two end portions in the longitudinal direction (wheel circumferential direction X) of the main body 13 (see FIG. 4).

As illustrated in FIG. 2, a communication hole 18*a* is formed in the tube body 18.

The communication hole 18*a* extends from the inside of the tube body 18 to the inside of the main body portion 13. The communication hole 18*a* extending in the wheel circumferential direction in the main body portion 13 is formed by partitioning a hollow portion of the main body portion 13 by a division wall 60. The division wall 60 of this embodiment is defined by a recess portion 62 that is formed as a recess from the top portion 25*a* to the bottom portion 25*b* and a recess portion 64 that is formed as a recess from the bottom portion 25*b* to the top portion 25*a*. This communication hole 18*a* allows the sub air chamber SC (see FIG. 3) formed in the main body portion 13 and a tire air chamber 9 (see FIG. 3) formed between a top of the well portion 11*c* (see FIG. 3) and the (unillustrated) tire to communicate with each other.

As described above, the Helmholtz resonator 10 of this embodiment is, for example, a blow-molded product made of such a synthetic resin as a polyamide resin. The present invention is not limited to the above-mentioned synthetic resin; however, it is preferably a polyamide resin with a polyamide MXD6 as a base resin, or preferably a nylon 6.

As illustrated in FIG. 3, the Helmholtz resonator 10 comprises a pair of extended wall portions 26,26, and a pair of opposite wall portions 27, 27.

The pair of extended wall portions 26, 26 slightly extend toward the vertical wall 14 and the vertical wall 15 respectively in the wheel width direction Y from end portions in the wheel width direction of the bottom portion 25*b* of the main body portion 13. The bottom portion 25*b* and the pair of extended wall portions 26, 26 integrally form a convex shape protruding toward the center in the wheel radial direction Z. That is, each of the extended wall portions 26, 26 is curved outward in the wheel radial direction Z as it goes further apart from the bottom portion 25*b*.

The pair of opposite wall portions 27, 27 extend outward in the wheel radial direction Z from end portions in the width direction of the pair of extended wall portions 26, 26, and are respectively positioned at the opposite sides of the main body portion 13 in the wheel width direction Y. The pair of opposite wall portions 27, 27 respectively comprise surfaces (hereinafter referred to as outward surfaces 27a) facing sides opposite to the main body portion 13. The heights of (heights in the wheel radial direction Z) of the pair of opposite wall portions 27, 27 are equal to the heights of the vertical walls 14, 15.

The Helmholtz resonator 10 having the above-mentioned configuration is disposed between the pair of vertical walls 14, 15 and fixed to the rim 11 with an adhesive applied to the side surfaces 14a, 15a of the pair of vertical walls 14, 15. Adhesive layers 30, 30 are formed by curing the adhesive between the outward surfaces 27a, 27a of the pair of opposite wall portions 27, 27 and the side surfaces 14a, 15a of the pair of vertical walls 14, 15. The adhesive layers 30, 30 extend in the wheel circumferential direction, and the whole areas of the outward surfaces 27a, 27a in the wheel circumferential direction are bonded to the side surfaces 14a, 15a. The adhesive layers 30, 30 illustrated in FIG. 3 is exaggerated as being relatively thick for ease of visibility; however, the thicknesses of the adhesive layers 30, 30 of this embodiment are not particularly limited.

For example, the adhesive is a thermoplastic resin adhesive made of a ethylene vinyl acetate resin (a hot-melt type) or the like, a thermosetting resin adhesive made of an epoxy resin, a polyurethane resin, an acryl resin, a polyamide resin (a polyaromatic type), or the like, an elastomer adhesive made of a synthetic rubber, a thermoplastic elastomer, or the like; however, it is not limited thereto.

According to the Helmholtz resonator 10 fixed with the adhesive, the bottom portion 25b is in contact with the outer circumferential surface 11d, and the pair of extended wall portions 26, 26 are apart (spaced) from the outer circumferential surface 11d. That is, although the bottom portion 25b contacts and the pair of extended wall portions 26, 26 face the outer circumferential surface 11d of the well portion 11c, no adhesive is applied and they are not bonded to the outer circumferential surface 11d. For this reason, the Helmholtz resonator 10 is not bonded to the outer circumferential surface 11d of the well portion 11c.

Figure 4:
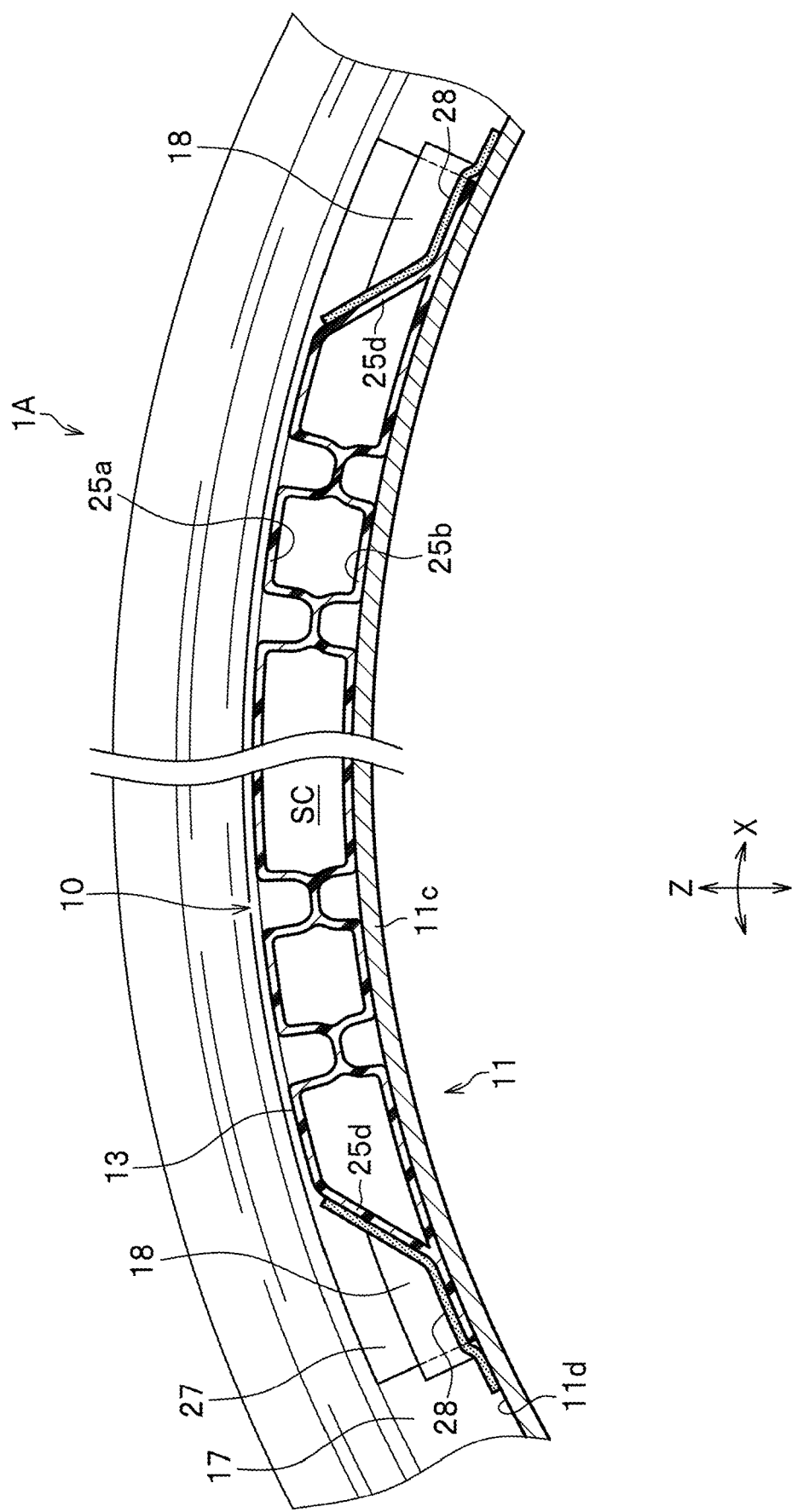
FIG. 4 is a cross-sectional view of the vehicle wheel according to the first embodiment of the present invention when viewed from a wheel width direction.

As illustrated in FIG. 4, a pair of end portions of the Helmholtz resonator 10 in the wheel circumferential direction are respectively secured to the rim 11 by a pair of fixing reinforcement portions 28, 28. The fixing reinforcement portions 28, 28 are tapes applied from the outer circumferential surface 11d of the well portion 11c to outer top surfaces (opposite end portions of the bottom portion 25b in the wheel circumferential direction and the end wall portions 25d) of the Helmholtz resonator 10.

According to the above fixing configuration, the Helmholtz resonator 10 is not bonded to the outer circumferential surface 11d of the well portion 11c. Thus, even when the vehicle wheel 1A is deformed, the Helmholtz resonator 10 is not affected by the deformation. That is, according to this embodiment, the configuration prevents deformation of the Helmholtz resonator 10, following deformation of the outer circumferential surface 11d of the well portion 11c.

The bottom portion 25b contacting and the pair of extended wall portions 26, 26 facing the outer circumferential surface 11d of the well portion 11c form the convex shape protruding toward the center in the wheel radial direction. In addition, the bottom portion 25b and the pair of extended wall portions 26, 26 are not bonded to the outer circumferential surface 11d of the well portion 11c. Thus, when the vehicle wheel 1A is rotated and a centrifugal force $F_2$ is applied to the Helmholtz resonator 10, the center of the bottom portion 25b in the wheel width direction tries to rise from the well portion 11c. That is, the bottom portion 25b and the pair of extended wall portions 26, 26 are deformed to be enlarged in a direction in which the pair of vertical walls 14, 15 are disposed and to be a straight line. As a result, a pressure force $F_1$ toward the pair of vertical walls 14, 15 is applied to the pair of opposite wall portions 27, 27.

<Operational Advantage>

Next, the operational advantage provided by the vehicle wheel 1A of this embodiment is described.

The vehicle wheel 1A of this embodiment comprises the pair of vertical walls 14, 15 that extend vertically up from the outer circumferential surface 11d of the well portion 11c and extend in the wheel circumferential direction and the Helmholtz resonator 10 that is disposed between the pair of vertical walls 14, 15 and bonded to the pair of vertical walls 14, 15 with the adhesive, wherein the Helmholtz resonator 10 is not bonded to the outer circumferential surface 11d of the well portion 11c.

According to this vehicle wheel 1A, the Helmholtz resonator 10 is not deformed following deformation of the outer circumferential surface 11d of the well portion 11c. Thus, a noise caused by a pipe resonance can be sufficiently reduced even when the vehicle wheel 1A is deformed.

The Helmholtz resonator 10 has a feature that the Helmholtz resonator 10 bonded between the pair of vertical walls 14, 15 has such a shape as to have the Helmholtz resonator 10 deformed to be enlarged in a direction in which the pair of vertical walls are disposed when centrifugal force caused by rotation of the vehicle wheel is applied to the Helmholtz resonator.

According to this vehicle wheel 1A, the centrifugal force $F_2$ presses the pair of opposite wall portions 27, 27 against the pair of vertical walls 14, 15. Thus, it is possible to more preferably prevent detachment of the Helmholtz resonator 10 from the rim 11 when the centrifugal force $F_2$ is applied to the Helmholtz resonator 10.

The vehicle wheel 1A has a feature that the vehicle wheel 1A comprises the fixing reinforcement portions 28 that secure the end portions in the wheel circumferential direction of the Helmholtz resonator 10 to at least one of the well portion 11c and the pair of vertical walls 14, 15.

The end portions in the wheel circumferential direction of the Helmholtz resonator 10 is likely to be first detached when the centrifugal force $F_2$ is applied to the Helmholtz resonator 10, but according to this vehicle wheel 1A, the fixing strength of the end portions is improved. Thus, it is possible to more preferably prevent detachment of the Helmholtz resonator 10 from the rim 11 when the centrifugal force $F_2$ is applied to the Helmholtz resonator 10.

Second Embodiment

Figure 5:
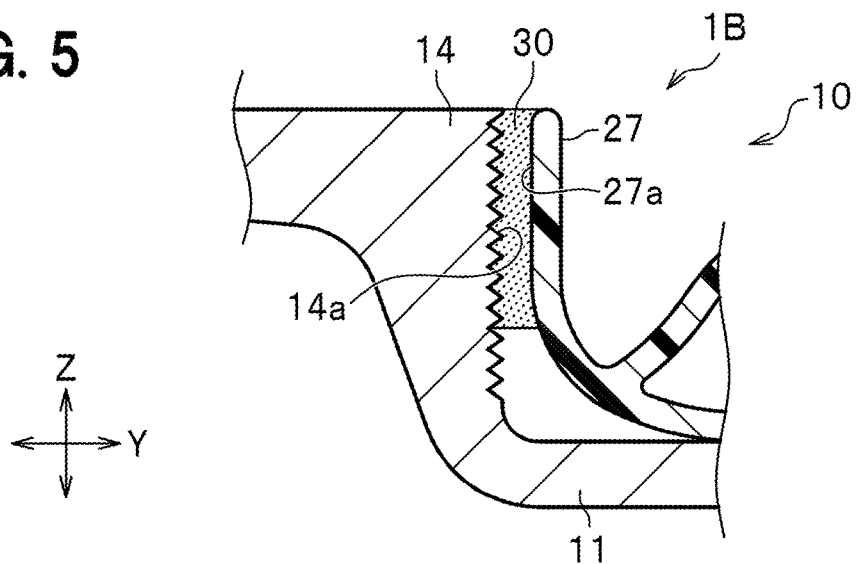
FIG. 5 is a cross-sectional view when a vehicle wheel according to a second embodiment of the present invention is partially enlarged.

Next, the vehicle wheel of a second embodiment of the present invention is described with focusing on difference from the vehicle wheel 1A according to the first embodiment. As illustrated in FIG. 5, according to a vehicle wheel 1B of a second embodiment of the present invention, the surface roughness of the side surface 14a of the vertical wall 14 is determined given that it is possible to more preferably prevent detachment of the Helmholtz resonator 10 which is to be caused by centrifugal force, through increasing an adhesion area of the side surface 14a fixed to the adhesive layer 30 (the same applies to the side surface 15a of the vertical wall 15). This surface roughness is increased by surface processing.

<Operational Advantage>

Next, the operational advantage provided by the vehicle wheel 1B of this embodiment is described.

The vehicle wheel 1B of this embodiment has a feature that surface processing is performed and the surface roughnessess of the side surfaces 14a, 15a of the pair of vertical walls 14, 15 are increased.

According to this vehicle wheel 1B, the adhesion areas of the pair of vertical walls 14, 15 fixed to the adhesive layers 30, 30 are increased, and thus adhesion strength are improved. This more preferably prevents detachment of the Helmholtz resonator 10 from the rim 11 when the centrifugal force $F_2$ is applied to the Helmholtz resonator 10.

Third Embodiment

Next, the vehicle wheel of a third embodiment of the present invention is described with focusing on difference from the vehicle wheel 1A according to the first embodiment. Although there is no particular illustration, according to a vehicle wheel of the third embodiment of the present invention, the surface roughness of the outward surface 27a (see FIG. 3) of each of the opposite wall portions 27, 27 is determined, given that it is possible to more preferably prevent detachment of the Helmholtz resonator 10 which is to be caused by centrifugal force, through increasing adhesion areas of the outward surfaces 27a, 27a fixed to the adhesive layers 30, 30. The surface roughnessess are increased by surface processing.

<Operational Advantage>

Next, the operational advantage provided by the vehicle wheel of this embodiment is described.

According to this vehicle wheel, the adhesion areas of the pair of opposite wall portions 27, 27 fixed to the adhesive layers 30, 30 are increased, and thus adhesion strength are improved. This more preferably prevents detachment of the Helmholtz resonator 10 from the rim 11 when the centrifugal force $F_2$ is applied to the Helmholtz resonator 10.

Fourth Embodiment

Figure 6:
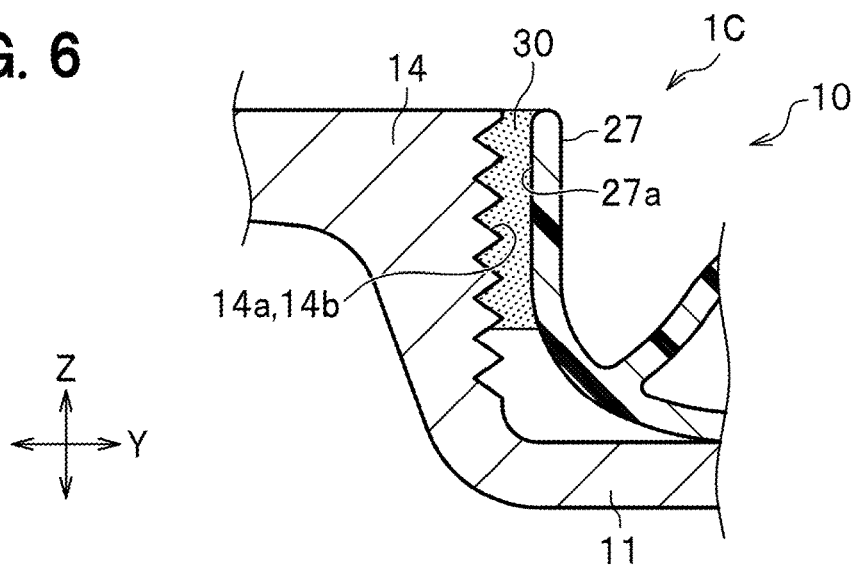
FIG. 6 is a cross-sectional view when a vehicle wheel according to a fourth embodiment of the present invention is partially enlarged.

Next, the vehicle wheel of a fourth embodiment of the present invention is described with focusing on difference from the vehicle wheel 1A according to the first embodiment. As illustrated in FIG. 6, according to a vehicle wheel 1C of the fourth embodiment of the present invention, a thread portion 14b is formed at the side surface 14a of the vertical wall 14 (the same applies to the vertical wall 15). Thread grooves of the thread portion 14b extend in the wheel circumferential direction. That is, at the side surface 14a, protrusion portions and recess portions of the thread portion 14b are alternately formed in the wheel radial direction. The thread portion 14b is shallower than a conventional circumferential groove formed by a conventional art and is formed by surface processing of the side surface 14a.

<Operational Advantage>

Next, the operational advantage provided by the vehicle wheel 1C of this embodiment is described.

The vehicle wheel 1C of this embodiment has a feature that the thread portion 14b is formed at each of the side surfaces 14a, 15a of the pair of wall portions 14, 15.

According to this vehicle wheel 1C, an adhesive enter the recess portions of the thread portions 14b and adhesion areas between the pair of vertical walls 14, 15 and the adhesive layers 30, 30 are increased, and thus adhesion strength are greatly improved. This more preferably prevents detachment of the Helmholtz resonator 10 from the rim 11 when the centrifugal force $F_2$ is applied to the Helmholtz resonator 10.

Fifth Embodiment

Figure 7:
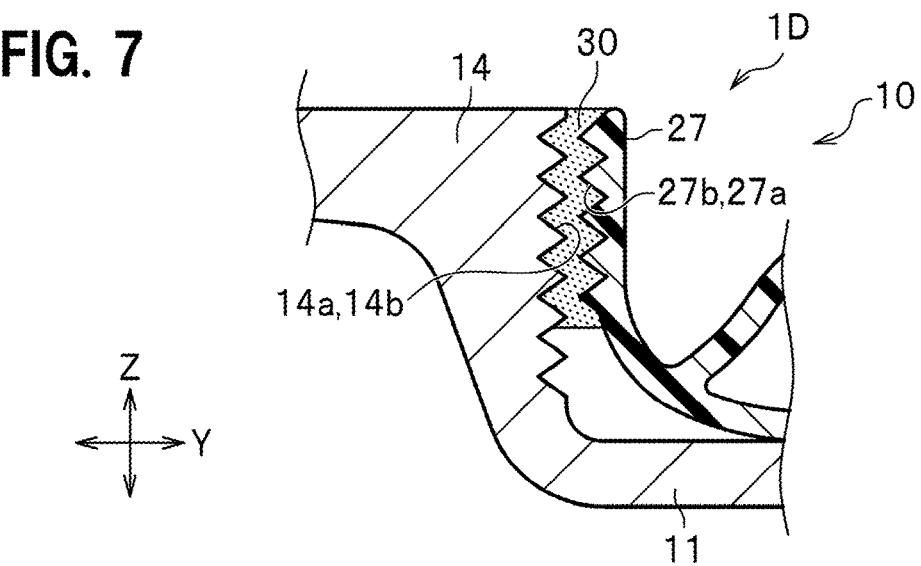
FIG. 7 is a cross-sectional view when a vehicle wheel according to a fifth embodiment of the present invention is partially enlarged.

Next, the vehicle wheel of a fifth embodiment of the present invention is described with focusing on difference from the vehicle wheel 1C according to the fourth embodiment. As illustrated in FIG. 7, according to a vehicle wheel 1D of the fifth embodiment of the present invention, thread portion 27b is formed at the outward surface 27a of the opposite wall portion 27 (the same applies to the extended wall portion 26 close to the vertical wall 15).

<Operational Advantage>

Next, the operational advantage provided by the vehicle wheel 1D of this embodiment is described.

The vehicle wheel 1D of this embodiment has a feature that the thread portions 27b are formed at the outward surfaces 27a of the pair of opposite wall portions 27.

According to this vehicle wheel 1D, an adhesive enter recess portions of the thread portions 27b and adhesion areas between the pair of opposite wall portions 27, 27 and the adhesive layers 30, 30 are increased, and thus adhesion strength are greatly improved. This more preferably prevents detachment of the Helmholtz resonator 10 from the rim 11 when the centrifugal force $F_2$ is applied to the Helmholtz resonator 10.

Although the embodiments of the present invention are described above, the present invention is not limited to those above embodiments and may be implemented to various embodiments. According to the above embodiments, the Helmholtz resonator 10 only made of a synthetic resin (see FIG. 3) may be used. However, the Helmholtz resonator 10 may be made of two or more kinds of different materials.

In addition, although the bottom portion 25b of the Helmholtz resonator 10 is on and is not bonded to the outer circumferential surface 11d of the well portion 11c according the above-mentioned embodiments, the bottom portion 25b may be apart (spaced) from the outer circumferential surface 11d.

It is understood that the foregoing description is that of the preferred embodiments of the invention and that various changes and modifications may be made thereto without departing from the spirit and scope of the invention as defined in the appended claims.

What is claimed is:

1. A vehicle wheel comprising:
   a pair of vertical walls extending vertically up from an outer circumferential surface of a well portion and extending in a wheel circumferential direction; and
   a Helmholtz resonator disposed between the pair of vertical walls and bonded to side surfaces of the pair of vertical walls with an adhesive;
   wherein the Helmholtz resonator is not bonded to the outer circumferential surface of the well portion.

2. The vehicle wheel of claim 1 comprising:
   thread portions formed at side surfaces of the pair of vertical walls.

3. The vehicle wheel of claim 1, wherein:
   the Helmholtz resonator bonded between the pair of vertical walls has such a shape as to have the Helmholtz resonator deformed to be enlarged in a direction in which the pair of vertical walls are disposed when centrifugal force caused by rotation of the vehicle wheel is applied to the Helmholtz resonator.

4. The vehicle wheel of claim 1 comprising:
fixing reinforcement portions that secure a pair of end portions of the Helmholtz resonator in the wheel circumferential direction to at least one of the well portion and the pair of vertical walls.

5. The vehicle wheel of claim 2, wherein:
the Helmholtz resonator bonded between the pair of vertical walls has such a shape as to have the Helmholtz resonator deformed to be enlarged in a direction in which the pair of vertical walls are disposed when centrifugal force caused by rotation of the vehicle wheel is applied to the Helmholtz resonator.

6. The vehicle wheel of claim 2 comprising:
fixing reinforcement portions that secure a pair of end portions of the Helmholtz resonator in the wheel circumferential direction to at least one of the well portion and the pair of vertical walls.

7. The vehicle wheel of claim 3 comprising:
fixing reinforcement portions that secure a pair of end portions of the Helmholtz resonator in the wheel circumferential direction to at least one of the well portion and the pair of vertical walls.

\* \* \* \* \*